Patented Mar. 10, 1931

1,796,070

UNITED STATES PATENT OFFICE

WILLIAM ERNEST WATERHOUSE, OF KINGSTON-UPON-HULL, ENGLAND

PROCESS FOR THE TREATMENT OF WORM-KILLING COMPOSITION

No Drawing. Application filed December 4, 1928, Serial No. 323,786, and in Great Britain December 19, 1927.

The present invention relates to a process for the preparation of a worm killing composition.

It has been suggested to use ground mowrah seeds or ground mowrah seed cake made by expressing the oil from mowrah seeds as a vermicide. It has also been proposed to use extracted mowrah meal, which remains after the extraction of the oil with fat solvents, such as benzine or trichlorethylene, for this purpose.

According to the present invention, a water-soluble vermicide is separated from mowrah material such as mowrah seed, mowrah cake, or mowrah meal, by extraction with water.

A further feature of the invention consists in performing the extraction under increased temperatures and pressures, and evaporating the solution to dryness under reduced pressure.

Small quantities of alcohol or the like might be added to the water but it is simpler to extract with pure water and I have found that excellent results are obtained by this inexpensive process.

Example 1 ton of dry benzine-extracted mowrah meal is placed in a suitable steam-heated kettle and 2 tons of water are added. The mixture is stirred and the temperature preferably though not necessarily raised to 80°-90° C. The slide of the kettle is then opened and the mixture of meal and water is run into a worm press. The dilute extract of the vermicidal constituent is thus squeezed out into a suitable tank, and then passed through a filter press to separate any suspended insoluble matter. The clear extract is then evaporated under reduced pressure and ground in a suitable mill. The resulting product is a fine chocolate coloured powder, soluble in water, with very high vermicidal properties.

It is not desired to limit the invention to the exact details of the above process.

The solid insoluble nitrogenous residue is dried independently and may be used as a manure.

I declare that what I claim is:

A vermicide consisting of a water soluble brown powdered material prepared from powdered oil extracted mowrah seeds by first extracting the same with water and then vapourizing this solution to dryness.

In witness whereof, I have hereunto signed my name this 9th day of October, 1928.

WILLIAM ERNEST WATERHOUSE.